US00RE35896E

United States Patent [19]

Brunker et al.

[11] E Patent Number: Re. 35,896

[45] Reissued Date of Patent: Sep. 15, 1998

[54] GROUNDING ELECTRICAL CONNECTORS

[75] Inventors: David L. Brunker; Gary S. Manchester, both of Naperville; Richard A. Nelson, Geneva; Michael O'Sullivan, Willowbrook, all of Ill.

[73] Assignee: Molex Incorporated, Lisle, Ill.

[21] Appl. No.: 636,730

[22] Filed: Apr. 19, 1996

Related U.S. Patent Documents

Reissue of:

[64] Patent No.: 5,304,069
Issued: Apr. 19, 1994
Appl. No.: 96,117
Filed: Jul. 22, 1993

[51] Int. Cl.[6] ..... H01R 13/652

[52] U.S. Cl. ..... 439/108; 439/608; 439/101

[58] Field of Search ..... 439/101, 108, 439/608, 607, 610, 98

[56] References Cited

U.S. PATENT DOCUMENTS

| | | | |
|---|---|---|---|
| 4,846,711 | 7/1989 | Kobler et al. | 439/63 |
| 5,102,353 | 4/1992 | Brunker et al. | 439/608 |
| 5,104,341 | 4/1992 | Gilissen et al. | 439/608 |
| 5,174,770 | 12/1992 | Sasaki et al. | 439/108 |

*Primary Examiner*—Gary F. Paumen
*Attorney, Agent, or Firm*—Charles S. Cohen

[57] ABSTRACT

A grounding electrical connector system includes first and second mateable connector modules each having dielectric blocks mounting a plurality of terminals and a ground plate. The ground plates of the connector modules interengage with one another in a cross-shaped grounding configuration therebetween. The terminals of the connector modules are located in spaced dispositions such that a pair of mating terminals from each connector module is located in each of four quadrants defined by the cross-shaped grounding structure of the interengaging ground plate.

19 Claims, 5 Drawing Sheets

GROUNDING ELECTRICAL CONNECTORS

Matter enclosed in heavy brackets [ ] appears in the original patent but forms no part of this reissue specification; matter printed in italics indicates the additions made by reissue.

FIELD OF THE INVENTION

This invention generally relates to the art of electrical connectors and, particularly, to an electrical connector system having grounded interconnectable terminal modules.

BACKGROUND OF THE INVENTION

Electrical connectors are used to interconnect signal transmission lines to printed circuit boards, other electronic devices or to other complementary connectors. The transmission lines transmit signals through a plurality of conductors which, preferably, are physically separated and electromagnetically isolated along their length.

In the electronics industry, particularly the computer industry, the predominant system embodies a plurality of plug-in type connectors in mating engagement with receptacle connectors on the computer, its main printed circuit board or other electronic devices. The transmission lines typically include coaxial electrical cables, either in round or flat form, and round cables are presently being used predominantly in relatively high frequency applications between various system components.

Classical coaxial designs derive their characteristic impedance from the geometrical relationship between the inner signal conductors and the outer shield member and the intervening dielectric constant. For a given impedance, signal conductor size and dielectric material, an overall outside dimension is defined. In order to increase signal density and reduce the overall outside dimensions of a transmission line connector system, alternate geometries and/or dielectric materials are required.

For data processing purposes, cables usually utilize twisted pairs of conductors to achieve the necessary characteristics, particularly impedance control and cross talk control. Coaxial cables are used in singular conductor configurations in high frequency applications, such as to a high-speed video monitor. Most often, the lower speed data transmission lines are separated from the high speed signal transmission lines. Consequently, different electrical connectors are often used for the lower speed data transmission lines than for the high speed signal lines This adds to the problem of requiring multiple connectors in ever-increasing miniaturized and high density applications.

Solutions to the above problems were addressed in U.S. Pat. No. 5,102,353 to Brunker et al. dated Apr. 7, 1992 and assigned to the assignee of this invention. That patent discloses an electrical connector which terminates both high speed signal transmission lines and the slower data transmission lines in a unique manner providing a common ground for the signal transmission lines.

The present invention is directed to further improvements in such connectors by providing novel grounding terminal modules having interconnectable ground plates, the modules being components of complementary mating electrical connectors.

SUMMARY OF THE INVENTION

An object, therefore, of the invention is to provide a new and improved electrical connector systems for interconnecting signal transmission lines in electronic devices, such as computers or the like.

In the exemplary embodiment of the invention, an electrical connector system includes a shielded connector for mating with a complementary connector along a mating axis. The shielded connector has a dielectric housing. An outer conductive shield member generally surrounds a mating portion of the dielectric housing. The invention contemplates providing an opening in the housing, and a grounding terminal module is adapted to be inserted into the opening. The module includes a ground member clamped between a pair of dielectric terminal blocks. At least one terminal is mounted in each terminal block.

As disclosed herein, the terminal blocks are fabricated of molded plastic material with the respective terminals thereof being inert molded therein. The ground member is a generally planar ground plate separating the respective terminals mounted in the terminal blocks and providing primary capacitive coupling between each terminal and the ground member.

The invention contemplates that the complementary connector also include a generally planar ground plate for engaging the ground plate of the grounding terminal module of the shielded connector. One of the ground plates of the module and the complementary connector includes a slot for receiving the other ground plate and thereby define an interengaging cross-shaped grounding structure therebetween. Each dielectric terminal block mounts a pair of terminals in a spaced disposition such that one terminal is located in each of four quadrants defined by the cross-shaped grounding structure of the interengaging ground plates.

Other objects features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
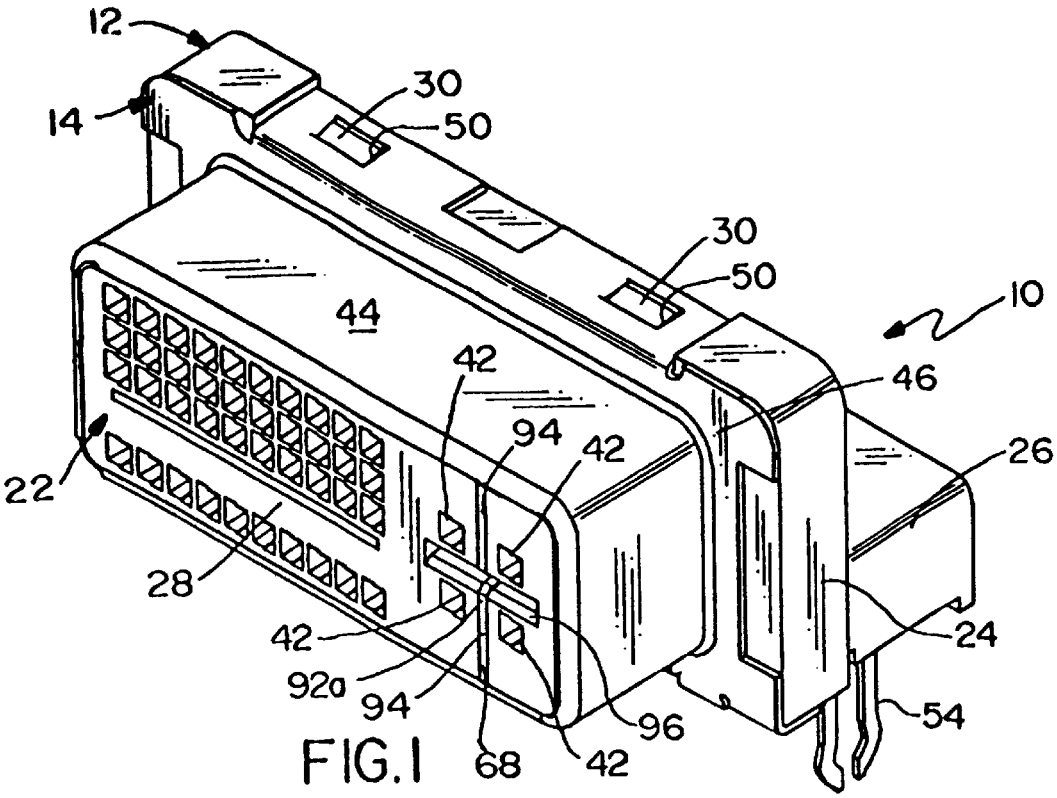
FIG. 1 is a perspective view of the front or mating side of an electrical connector embodying the concepts of the invention.
Figure 2:
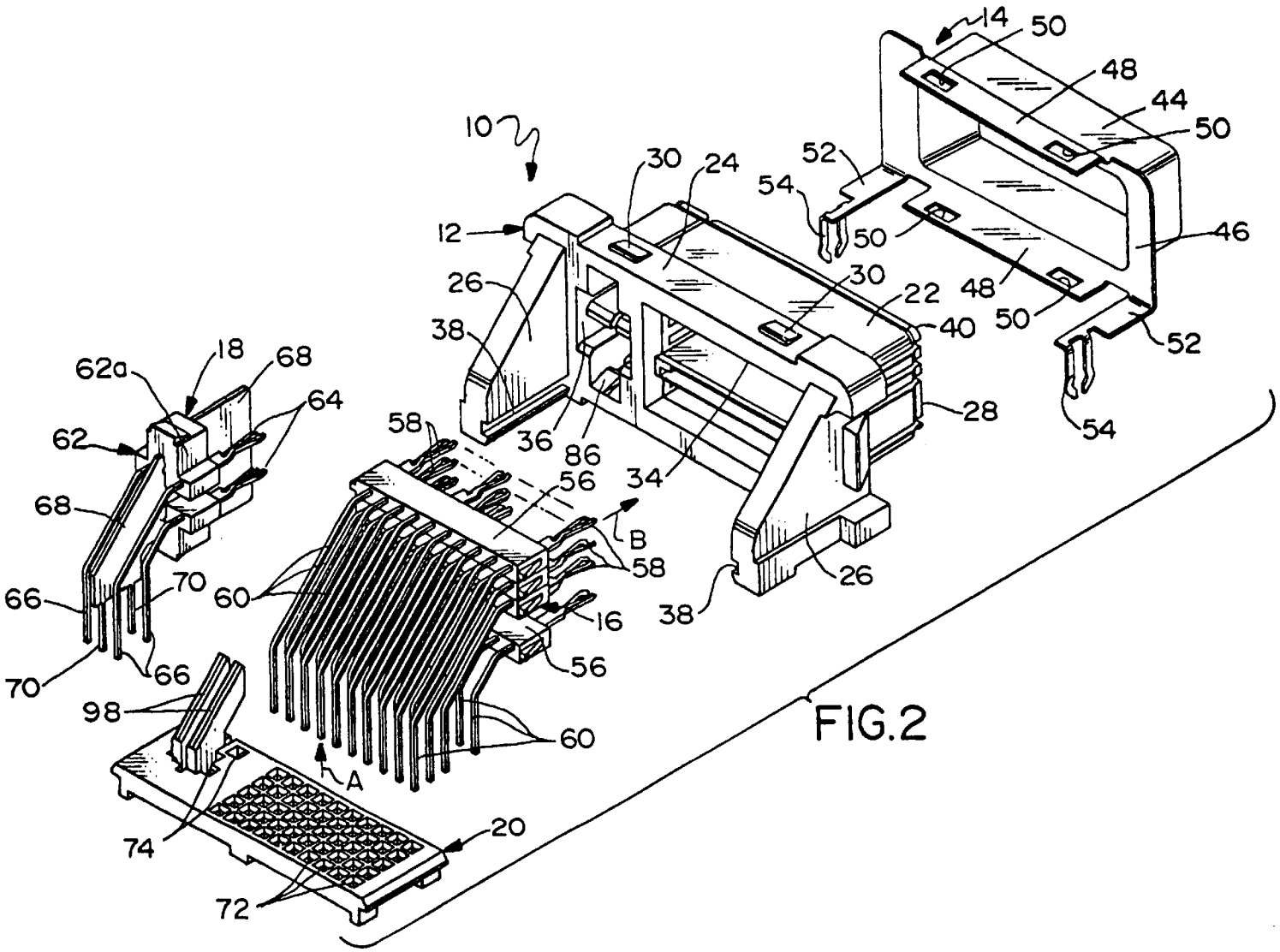
FIG. 2 is an exploded perspective view looking toward the rear side of the connector.

Referring to the drawings in greater detail, and first to FIGS. 1 and 2, the invention is embodied in a hybrid electrical connector, generally designated 10, for terminating both the conductors of slower data transmission lines and the conductors of high speed or high frequency transmission lines. More particularly, electrical connector 10 includes a dielectric housing, generally designated 12, a conductive shield, generally designated 14, data transmission terminal modules, generally designated 16 (FIG. 2), a high speed signal transmission terminal module, generally designated 18, and a tail aligning device, generally designated 20. The overall configuration of dielectric housing 12 and conductive shield 14 define a generally rectangular electrical connector.

Dielectric housing 12 includes a forwardly directed, generally rectangular mating portion 22 projecting forwardly from an enlarged, transversely outwardly projecting flange portion 24 as best seen in FIG. 2. A pair of triangulated side wings 26 project rearwardly from opposite sides of flange portion 24. Mating portion 22 defines a mating face 28 as best seen in FIG. 1. The housing is unitarily molded of dielectric material such as plastic or the like, and a pair of ramped latch bosses 30 are molded integral with and project outwardly from both the top and bottom of flange portion 24 as seen in FIG. 2, for latching interengagement with conductive shield 14 as described hereinafter. As seen in FIG. 2, the rear of dielectric housing 12 includes a receptacle area 34 for receiving data transmission terminal modules 16, and an opening 36 for receiving high speed signal transmission terminal module 18. Grooves 38 are formed on the inside of side wings 26 for slidingly receiving tail aligning device 20. Lastly, as seen in FIG. 1, the front face 28 of mating portion 22 of the dielectric housing has a first array of passages 40 for receiving a plurality of lower speed data contacts or terminals from the complementary mating connector, and a second array of passages 42 for receiving a plurality of high speed signal contacts or terminals of the complementary connector.

Conductive shield 14 has a forwardly projecting, generally rectangularly shaped shroud portion 44 for surrounding mating portion 22 of dielectric housing 12, along with a peripheral face plate portion 46 for substantially covering the front surface of flange portion 24 of the housing. The shied has a pair of rearwardly projecting flanges 48, each flange having a pair of latch apertures 50 formed therein. A pair of legs 52 project rearwardly from opposite sides of peripheral face plate portion 46, each leg terminating in a bifurcated boardlock 54 which is insertable into an appropriate mounting hole in a printed circuit board and for interconnection with a ground circuit on the board or in the hole The conductive shield is fabricated of stamped and formed sheet metal and is assembled to dielectric housing 12 as shown in FIG. 1, whereupon ramped latch hoses 30 map into latching engagement within latch apertures 50 of the shield.

High speed signal transmission terminal modules 16 have elongated dielectric blocks 56 within which a plurality of data transmission terminals are insert molded. The data transmission terminals include contact or terminal portions 58 (FIG. 2) which project into the first array of passages 40 (FIG. 1). The data transmission terminals have tail portions 60 projecting from the mar of blocks 56 and angled downwardly with composite bonds resulting in a right-angle to a mating axis of the connector perpendicular to mating face 28.

Generally, high speed signal transmission terminal module 18 includes a modular block construction, generally designated 62, for mounting a plurality of high speed signal terminals each having a forwardly projecting contact or terminal portion 64 (FIG. 2) projecting into a respective one of the second array of passages 42 (FIG. 1) in mating face 21 of the dielectric housing. The high speed signal transmission terminals have tail portions 66 projecting rearwardly and downwardly with composite bonds resulting in a right-angle to the mating axis of the connector. As will be described in greater detail hereinafter, high speed signal transmission terminal module 18 includes a ground plate 68 located between two pairs of terminal tails 66 of the signal transmission terminal module. The ground plate, itself, has tails 70 projecting downwardly therefrom.

Tails 60 of the terminals of data transmission modules 16, tails 66 of the signal terminals of high speed signal transmission terminal module 18 and tails 70 of ground plate 68 all are adapted for insertion into appropriate holes in a printed circuit board for solder connection to circuit traces on the board or in the holes. Therefore, tail aligning device 20 includes a first array of apertures 72 for receiving tails 60 of the data transmission terminals and a second array of apertures 74 for receiving tails 66 of the terminals of high speed signal transmission terminal block 18.

In assembly, tail aligning device 20 is assembled to terminal modules 16 and 18 by insertion of the tails of the terminals into apertures 72,74 as described above, and as indicated by arrow "A" in FIG. 2. This subassembly then is assembled to dielectric housing 12 in the direction of arrow "B" by inserting data transmission terminal modules 16 into receptacle area 34 and high speed signal transmission terminal module 18 into opening 36, as tail aligning device 20 slides within grooves 38 of the dielectric housing.

The invention herein is directed primarily to the construction of high speed signal transmission terminal module 18, as well as to an electrical connector system wherein the terminal module is groundingly interconnected with a terminal module of a second or complementary electrical connector, described hereinafter.

Figure 3:
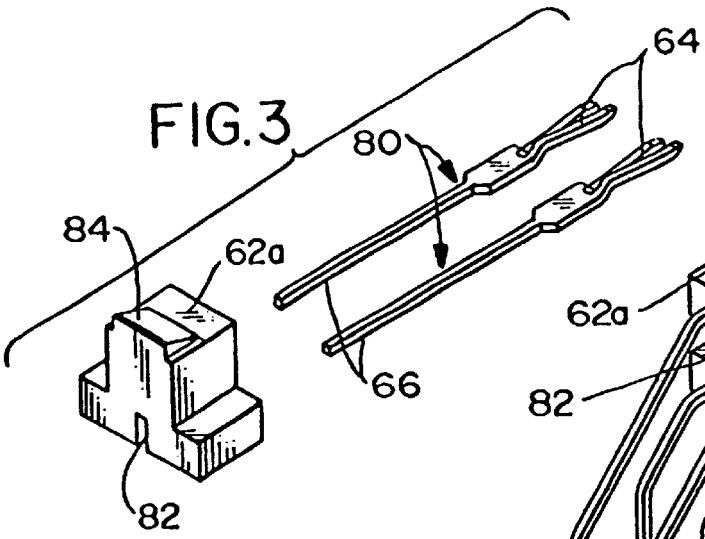
FIG. 3 is an exploded perspective view of one of the terminal blocks and its pair of tern forming part of the grounding terminal module.
Figure 4:
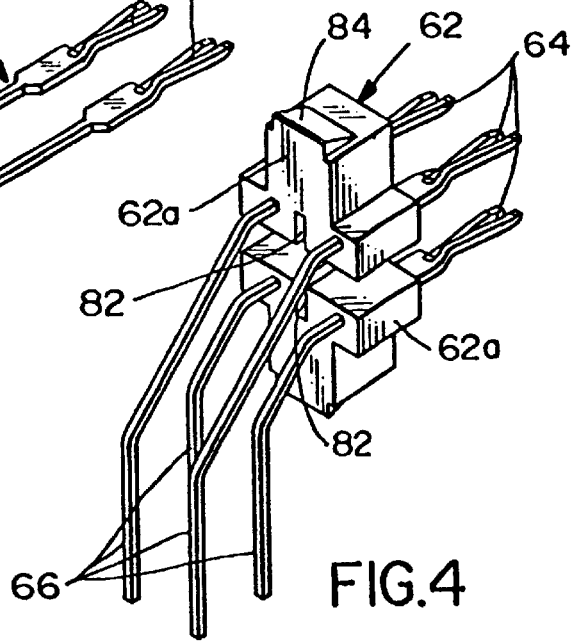
FIG. 4 is a perspective view of both terminal blocks and their respective terminals, which clamp the ground plate of the grounding terminal module.

More particularly, referring to FIGS. 3–6 in conjunction with FIG. 2, the mounting block structure 62 of terminal module 18 includes a pair of identical terminal blocks 62a, one terminal block being shown in FIG. 3, and a pair of the terminal blocks being shown in FIG. 4 in a mirror-imaged orientation. A pair of terminals, generally designated 80 in FIG. 3, are insert molded in each terminal block 62a so that contact or terminal portions 64 project forwardly out of the front side of the terminal blocks and tails 66 project rearwardly out of the rear side of the blocks as seen in FIG. 4. The terminal blocks have sots 82 for edge-wise clamping ground plate 68 therebetween, as described hereinafter. Lastly, each terminal block 62a includes a ramped latch boss 84 for snapping behind upper and lower ramped latch bosses 86 (FIG. 2) when terminal module 18 is inserted or assembled into opening 36.

Figure 5:
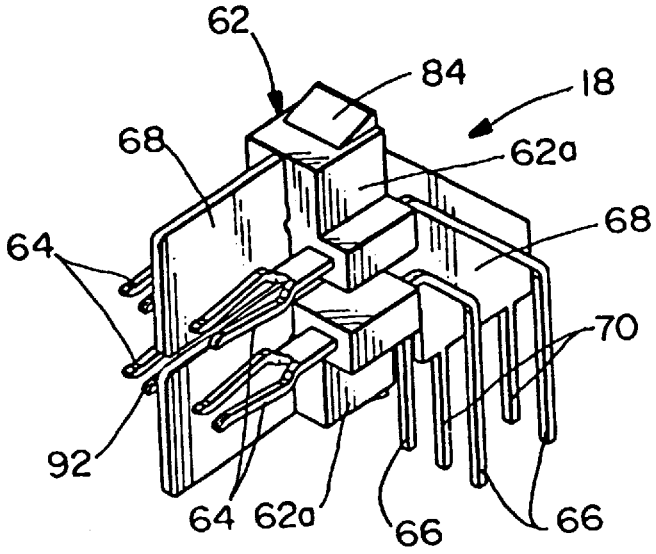
FIG. 5 is a front perspective view of the fully assembled grounding terminal module.
Figure 6:
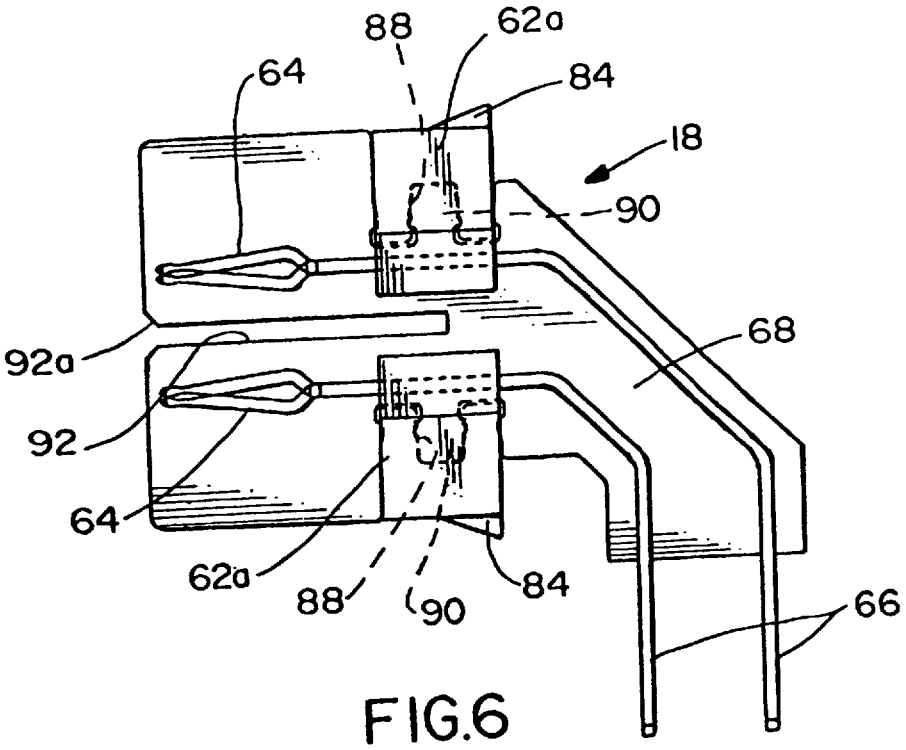
FIG. 6 is a side elevational view of the grounding terminal module.

FIGS. 2, 5 and 6 show how terminal blocks 62a clamp ground plate 68 therebetween. In assembly of terminal module 18, the ground plate is located between the two terminals of each terminal block 62a as best seen in FIG. 5. FIG. 6 shows that each terminal block 62a includes an interior cavity 88 for receiving a barbed locking tongue 90 integral with the ground plate which may be stamped from sheet metal material. Although the terminal blocks can be considered to clamp the ground plate when the module is inserted into opening 36 in connector housing 12, in initial assembled condition, the terminal blocks actually are locked onto the ground plate by means of locking tongues 90 within cavities 88 by an interference fit therebetween.

As best teen in FIGS. 5 and 6, ground plate 68 includes a slot 92 which has a chamfered mouth 92a at the front of terminal module 18. In other words, the slot opens in a mating direction of the connector. Specifically, referring back to FIG. 1, ground plate 68 is located in a vertical groove 94 in mating portion 22 of dielectric housing 12, and mouth 92a opens in mating face 28 of the housing. For purposes to be described in greater detail hereinafter, a horizontal slot or groove 96 also is formed in the mating portion of the dielectric housing, intersecting groove 94 and ground plate 68 in a cross-shaped configuration. It also should be noted that passages 42 are located individually in each of four quadrants defined by grooves 94 and 96. Lastly, and referring to FIG. 2, when high speed signal transmission terminal module 18 is inserted or assembled into opening 36 in dielectric housing 12, with tail aligning device 20 preassembled thereto, a pair of dielectric partitions 98 of the tail aligning device are located on opposite sides of ground plate 68, between the ground plate and the longer of the terminal tails 66 on opposite sides of the ground plate.

*As is illustrated in particular in FIGS. 1, 2, and 5–6, each of the terminals 80 has its projecting contact or terminal mating portion 64 extending into the mating portion or region 22 of the connector 10. These terminals 80 extend in the direction of a mating axis which extends in the direction the connector 10 is to be mated. The terminals 80 are each disposed such that a rectangularly shaped area is defined by the terminals 80. One of the terminals 80 is at each of the corners of this rectangularly shaped area and the center of the rectangularly shaped area is located essentially in the slot 92, or in other words, on a line that extends generally parallel to the mating axis.*

Figure 8:
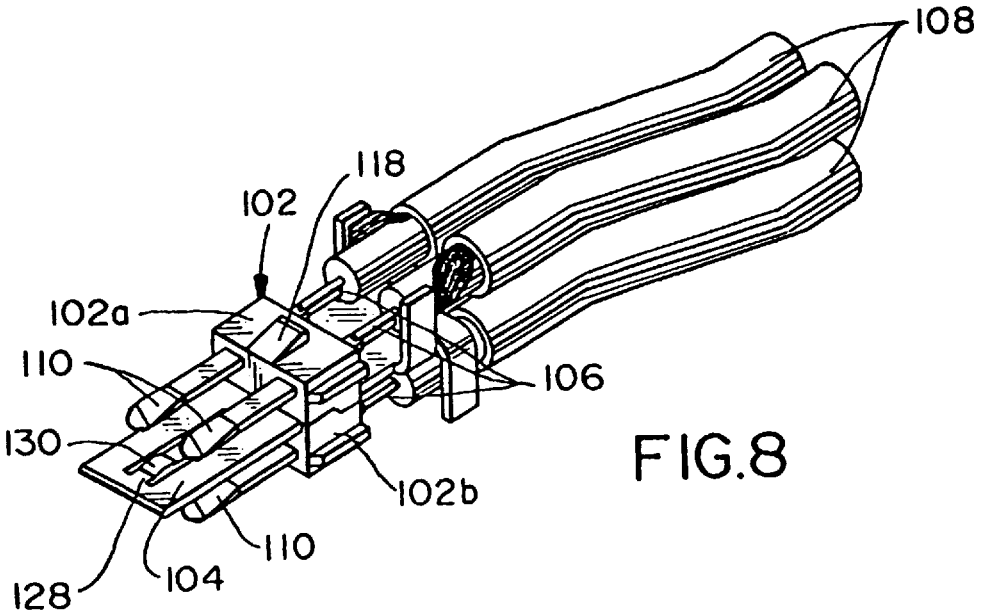
FIG. 8 is a perspective view of the grounding terminal module of the connector of FIG. 7.
Figure 7:
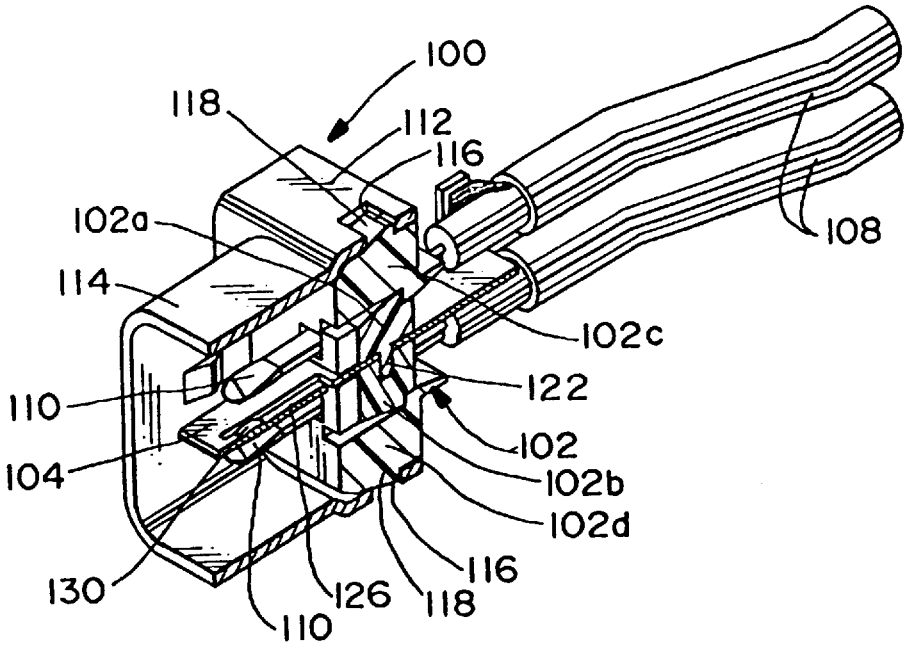
FIG. 7 is a sectioned perspective view of the high speed signal transmission portion of a second or complementary electrical connector for mating with the electrical connector of FIGS. 1–6.
Figure 9:
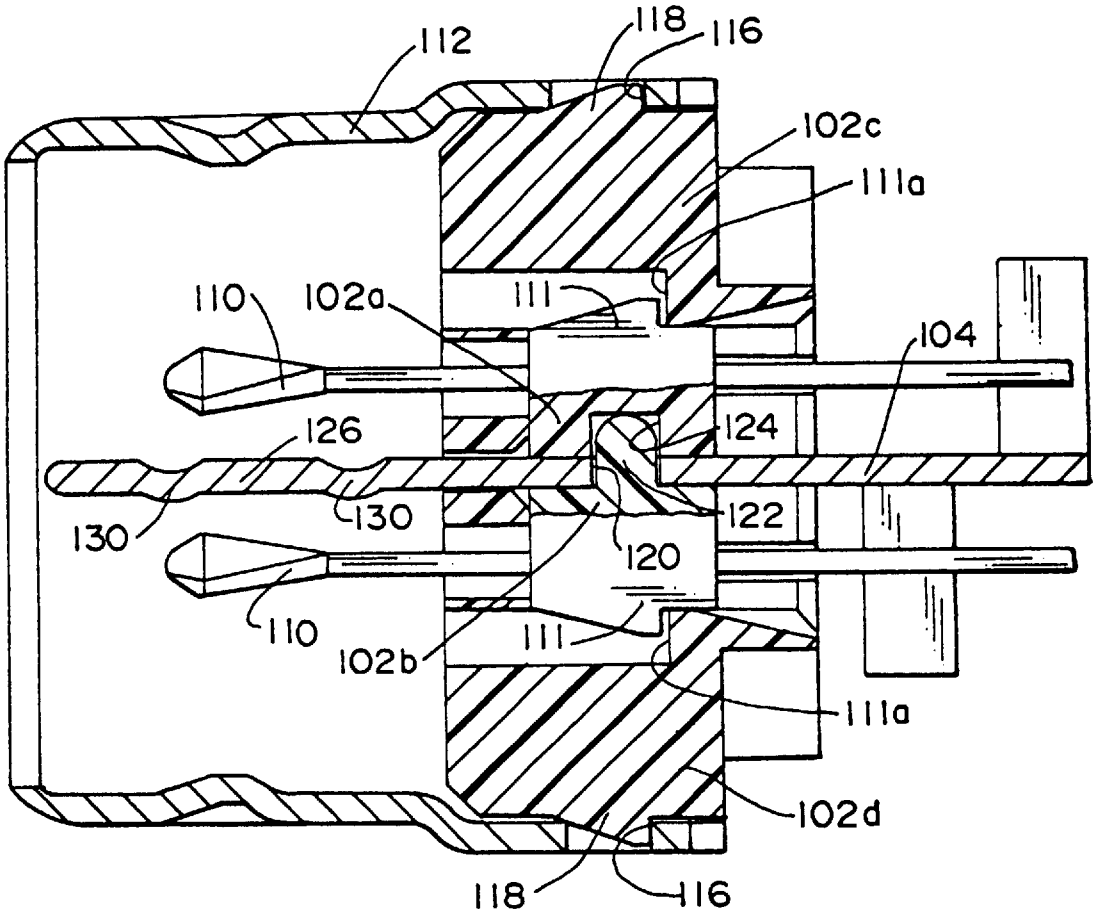
FIG. 9 is a section, on an enlarged scale, as looking toward the right-hand side of the depiction of the connector in FIG. 7.

The invention contemplates a novel electrical connector system wherein connector 10 (FIGS. 1 and 2) is mateable with a second or complementary connector in a unique manner for providing an interengaging grounding connection with high speed signal transmission terminal module 18. More particularly, FIGS. 7–9 show the high speed signal transmission terminal end of a second or complementary electrical connector, generally designated 100. The entire connector is not shown, because the inventive concept is directed to the grounding interconnection with terminal module 18.

Specifically, a second high speed signal transmission terminal module, generally designated 102, includes a pair of inner terminal blocks 102a and 102b which clamp a second ground plate 104 therebetween. Each terminal block 102a and 102b mount a pair of terminals 106 which are terminated to respective conductor wires 108. The terminals are mounted within the terminal blocks so that contact or terminal portions 110 project forwardly from the terminal blocks, with two contact portions from each terminal block being located on each opposite side of ground plate 104, as best seen in FIG. 8. Inner terminal blocks 102a and 102b, in turn, are snapped within a pair of outer terminal blocks 102c and 102d by means of ramped latch bosses 111 on the inner terminal blocks which latch behind shoulders 111a of the outer terminal blocks.

Connector 100 also is a shielded electrical connector and includes a shield member 112 having a forwardly projecting shroud portion 114 which is adapted to surround and engage shroud portion 44 of shield 14 of connector 10 as best seen in FIG. 1. Shield 112 has a plurality of apertures 116 for snap-latch engagement with ramped latch bosses 118 molded integrally with outer terminal blocks 102c and 102d as best seen in FIGS. 7 and 9.

*As is illustrated in particular in FIGS. 7–8, each of the terminals 106 has its projecting contact or terminal mating portion 110 extending into the mating portion or region of the connector 100 that is within the protecting shroud portion 114. These terminals 106 extend in the direction of a mating axis which extends in the direction the connector 100 is to be mated with the connector 10. The terminals 106 are each disposed such that a rectangularly shaped area is defined by the terminals 106. One of the terminals 106 is at each of the corners of this rectangularly shaped area and the center of the rectangularly shaped area is located on a line that extends generally parallel to the mating axis.*

The means for clamping ground plate 104 between terminal blocks 102a and 102b is best shown in FIG. 9. Specifically the ground plate has a hole 120 through which a post 122 from terminal block 102b projects. The post extends through the hole in the ground plate and into a recess 124 in terminal block 102a. Although post 122 could be press-fit within recess 124 for preliminary assembly of the terminal blocks and the ground plate, once this subassembly is inserted into shield 112 as shown in FIG. 9, the terminal blocks are effective to clamp the ground plate therebetween.

Referring back to FIGS. 7 and 8, ground plate 104 has a spring finger 126 stamped out of the center thereof. The spring finger is cantilevered about a point 128. The spring finger has a pair of dimples 130 formed therein, the dimples being most clearly shown in FIG. 9.

The mating interconnection of connectors 10 and 100, along with the functional grounding interconnection between terminal modules 18 and 102, now will be described. Reference particularly should be made to FIG. 1 wherein mating face 28, along with cross-shaped grooves 94 and 96 are shown most clearly. When connector 100 is mated with connector 10, shroud portion 114 of shield 112 of connector 100 mates about shroud portion 44 of shield 14 of connector 10 in a telescoping fashion. Contact portions 110 of terminals 106 enter into passages 42 in the mating face 28 of connector 10, whereupon contact portions 110 mate with contact portions 64 of terminals 80 of high speed signal transmission terminal module 18. During this mating assembly, ground plate 104 (FIGS. 7–9) enters groove 96 (FIG. 1) in mating face 28. When fully mated, ground plates 104 and 68 define a cross-shaped grounding structure therebetween, with one pair of the mating terminal contact portions 64 and 110 being located in each quadrant defined by the cross-shaped grounding structure of the interengaging ground plates. Spring finger 126 and detents 130 of ground plate 104 enter slot 92 of ground plate 68 and establish a solid interconnection between the two ground plates.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. In an electrical connector system which includes a shielded connector for mating with a complementary connector along a mating axis, the shielded connector having a dielectric housing, and an outer conductive shield member generally surrounding a mating portion of the dielectric housing, wherein the improvement comprises an opening in said housing and a grounding terminal module adapted to be inserted into the opening, the module including a ground member clamped by and between a pair of dielectric terminal blocks, and at least one terminal mounted in each terminal block.

2. In an electrical connector system as set forth in claim 1, wherein said terminal blocks are fabricated of molded plastic material with the respective terminals thereof being insert molded therein.

3. In an electrical connector system as set forth in claim 1, wherein said ground member comprise a generally planar ground plate.

4. In an electrical connector system as set forth in claim 3, wherein said complementary connector includes a generally planar ground plate for engaging the ground plate of the grounding terminal module, one of the ground plates of the module and the complementary connector including a dot for receiving the other ground plate and thereby define an interengaging cross-shaped grounding structure therebetween.

5. In an electrical connector system as set forth in claim 4, wherein each dielectric terminal block around a pair of terminals in a spaced disposition such that one terminal is located in each of four quadrants defined by the cross-shaped grounding structure of the interengaging ground plates.

6. In an electrical connector system as set forth in claim 5, wherein said terminal blocks are fabricated of molded plastic material with the respective terminals thereof being insert molded therein.

*7. An electrical connector assembly comprising:*

*a first connector having a first dielectric housing means, a first mating axis, and at least three first terminal means extending to a first mating region of said first connector, each of said first terminal means having a first mating portion in said first mating region and extending in the direction of said first mating axis through a corner of a first rectangularly shaped area having a first center on a first line extending generally parallel to said first mating axis;*

*a second complementary connector having a second dielectric housing means, a second mating axis, and at least three second terminal means extending to a second mating region of said second connector, each of said second terminal means having a second mating portion in said second mating region for mating with said first terminal means and extending in the direction of said second mating axis through a corner of a second rectangularly shaped area having a second center on a second line extending generally parallel to said second mating axis;*

*a first generally planar grounding means disposed in said first dielectric housing means and extending in a plane parallel to said first line and extending from said first center to at least opposite outer edges of said first rectangularly shaped area, equidistantly between at least an adjacent pair of said first terminal means and along said first mating axis to at least said first mating region;*

*a second generally planar grounding means disposed in said second dielectric housing and extending in a plane parallel to said second line and extending from said second center to at least opposite outer edges of said second rectangularly shaped area, equidistantly between at least an adjacent pair of said second terminal means and along said second mating axis to at least said second mating region; and*

*interengaging means in said first grounding means for receiving at least a portion of said second grounding means to thereby mate said first and second grounding means when said first and second connectors are mated along said first and second mating axes such that said first and second interengaged grounding means are disposed perpendicular to each other to define four quadrants with only one of said mated first and second terminal means disposed in each of said four quadrants.*

*8. An electrical connector assembly as set forth in claim 7 wherein said first grounding means is a generally planar first ground plate having a first mating end disposed between said first mating portions of at least one adjacent pair of said first terminal means, said second grounding means is a generally second ground plate having a second mating end disposed between said second mating portions of at least one adjacent pair of said second terminal means and said interengaging means includes a slot extending in said first around plate to at least said first mating end for receiving said second around plate when said first and second connectors are mated.*

*9. An electrical connector assembly as set forth in claim 8 wherein said first and second around plates form a cross-shaped grounding structure when said first and second connectors are mated.*

*10. An electrical connector assembly as set forth in claim 9 wherein said first connector includes four first terminal means disposed equidistantly and symmetrically with respect to said first line and wherein said second connector includes four second terminal means disposed equidistantly and symmetrically with respect to said second line such that one of said first terminal means and one of said second terminal means are disposed in each of said four quadrants defined by said cross-shaped grounding structure when said first and second connectors are mated.*

*11. An electrical connector assembly as set forth in claim 7 wherein said first and second lines are coextensive when said first and second connectors are mated and said first and second grounding means intersect along said first and second lines when said first and second connectors are mated.*

*12. An electrical connector assembly as set forth in claim 7 wherein said first dielectric housing means includes a first outer conductive shielding means generally disposed about said first mating region and wherein said second dielectric housing means includes a second outer conductive shielding means generally disposed about said second mating region.*

*13. An electrical connector adapted to mate with a complementary connector having a complementary dielectric housing means, a complementary mating axis, and at least three complementary terminal means extending to a complementary mating region of said complementary connector, each of said three complementary terminal means having a complementary mating portion in said complementary mating region that extends in the direction of said complementary mating axis through a corner of a complementary rectangularly shaped area having a complementary center on a complementary line extending generally parallel to said complementary mating axis, said electrical connector comprising:*

*a dielectric housing means having a mating axis and at least three terminal means extending to a mating region of said connector, each of said three terminal means having a mating portion in said mating region that*

*extends in the direction of said mating axis through a corner of a rectangularly shaped area having a center on a line extending generally parallel to said mating axis;*

*a grounding means disposed in said dielectric housing means that extends along said mating axis to at least said mating region between an adjacent pair of terminal means and to at least opposite outer edges of said rectangularly shaped area, said grounding means being adapted to be mated with a complementary grounding means disposed in said complementary dielectric housing means that extends along said complementary mating axis to at least said complementary mating region between an adjacent pair of complementary terminal means and to at least opposite outer edges of said complementary rectangularly shaped area, said grounding means having an interengaging means for receiving at least a portion of said complementary grounding means to thereby mate said grounding means and said complementary grounding means perpendicular to each other when said connector and said complementary connector are mated along said mating axis and said complementary mating axis such that each of said terminals means and said complementary terminal means that are mated together are separated from each adjacent ones of said terminal means and said complementary terminal means by said mated grounding means and complementary grounding means.*

*14. An electrical connector adapted to be mated with a complementary connector having a complementary dielectric housing means extending from a complementary forward mating end to a complementary rear end, a complementary mating axis, and at least three complementary terminal means extending to a complementary mating region of said complementary connector, each of said three complementary terminal means having a complementary mating portion extending to a complementary mating region of said complementary connector at said complementary forward mating end, having a complementary tail portion extending from said complementary rear end of said complementary housing means and extending in the direction of said complementary mating axis through a corner of a complementary rectangularly shaped area having its complementary center on a complementary line extending generally parallel to said complementary mating axis, said electrical connector comprising:*

*a dielectric housing means extending from a forward mating end to a rear end, having a mating axis, and at least three terminal means extending to a mating region of said connector, each of said three terminal means having a mating portion extending to a mating region of said connector at said forward mating end, having a tail portion extending from said rear end of said housing means and extending in the direction of said mating axis through a corner of a rectangularly shaped area having its center on a line extending generally parallel to said mating axis; and*

*a generally planar grounding means being disposed in said dielectric housing means that extends in a plane parallel to said line from said center to at least opposite outer edges of said rectangularly shaped area, equidistantly between at least an adjacent pair of said terminal means and along said mating axis to at least said mating region so as to be disposed between said mating portions of said adjacent pair of said terminal means and to beyond said rear end of said housing means so as to be disposed between said tail portions of said adjacent pair of said terminal means, said grounding means being adapted to be mated with a complementary grounding means disposed in said complementary dielectric housing means that extends in a plane parallel to said complementary line from said complementary center to at least opposite outer edges of said complementary rectangularly shaped area, equidistantly between at least an adjacent pair of said complementary terminal means and along said complementary mating axis to at least said complementary mating region so as to be disposed between said complementary mating portions of said adjacent pair of said complementary terminal means and to beyond said complementary rear end of said complementary housing means so as to be disposed between said complementary tail portions of said adjacent pair of said complementary terminal means, and said grounding means further having an interengaging means for receiving at least a portion of said complementary grounding means to thereby mate said grounding means and said complementary grounding means when said connector and said complementary connector are mated along said mating and said complementary mating axes such that each of said mated terminal means and complementary terminal means are separated from each adjacent ones of said mated terminal and complementary terminal means by said mated grounding means and complementary grounding means.*

*15. A shielded electrical connector adapted to mate with a complementary connector having a complementary dielectric housing means, a complementary mating axis, and at least three complementary terminal means extending to a complementary mating region of said complementary connector, each of said three complementary terminal means having a complementary mating portion in said complementary mating region that extends in the direction of said complementary mating axis through a corner of a complementary rectangularly shaped area having a complementary center on a complementary line extending generally parallel to said complementary mating axis and a complementary grounding means disposed in said complementary dielectric housing means that extends along said complementary mating axis to at least said complementary mating region between an adjacent pair of complementary terminal means and to at least opposite outer edges of said complementary rectangularly shaped area, and adapted to be terminated to a plurality of cables, each of said cables including an inner conductor, an inner dielectric surrounding said inner conductor, a metallic shield surrounding at least a portion of said inner dielectric and a dielectric sheath surrounding at least a portion of said metallic shield, said electrical connector comprising:*

*a dielectric housing means with an opening therein, having a mating axis, a mating region generally surrounded by an outer conductive shield member, and at least three terminal means extending to said mating region of said connector, each of said three terminal means having a mating portion in said mating region that extends in the direction of said mating axis through a corner of a rectangularly shaped area having a center on a line extending generally parallel to said mating axis;*

*a grounding means disposed in said dielectric housing means that extends along said mating axis to at least said mating region between an adjacent pair of termi-*

*nal means and to at least opposite outer edges of said rectangularly shaped area, said grounding means and said complementary grounding means having interengaging means for mating said grounding means and said complementary grounding means perpendicular to each other when said connector and said complementary connector are mated along said mating axis and said complementary mating axis such that each of said terminals means and said complementary terminal means that are mated together are separated from each adjacent ones of said terminal means and said complementary terminal means by said mated grounding means and complementary grounding means;*

*a grounding terminal module adapted to be inserted into said opening, said grounding terminal module including a dielectric block with said terminal means and said grounding means mounted therein; and*

*a grounding termination member on said grounding means for securing said metallic shield of said cable to said grounding means.*

*16. An electrical connector as set forth in claim 15 wherein said dielectric block is fabricated of molded plastic material with said terminal means being insert molded therein.*

*17. A shielded electrical connector adapted to mate with a complementary connector having a complementary dielectric housing means, a complementary mating axis, and at least three complementary terminal means extending to a complementary mating region of said complementary connector, each of said three complementary terminal means having a complementary mating portion in said complementary mating region that extends in the direction of said complementary mating axis through a corner of a complementary rectangularly shaped area having a complementary center on a complementary line extending generally parallel to said complementary mating axis and a complementary around plate disposed in said complementary dielectric housing means that extends along said complementary mating axis to at least said complementary mating region between an adjacent pair of complementary terminal means and to at least opposite outer edges of said complementary rectangularly shaped area, and adapted to be terminated to a plurality of cables, each of said cables including an inner conductor, an inner dielectric surrounding said inner conductor, a metallic shield surrounding at least a portion of said inner dielectric and a dielectric sheath surrounding at least a portion of said metallic shield, said electrical connector comprising:*

*a dielectric housing means having a mating axis, a front mating region generally surrounded by an outer conductive shield member, a rear portion, and at least three terminal means extending to said mating region of said connector, each of said three terminal means having a mating portion in said front mating region that extends in the direction of said mating axis through a corner of a rectangularly shaped area having a center on a line extending generally parallel to said mating axis and having a tail portion extending beyond said rear portion of said housing means;*

*a ground plate disposed in said dielectric housing means that extends along said mating axis to at least said mating region between an adjacent pair of terminal means, to at least opposite outer edges of said rectangularly shaped area, and to a around coupling portion that projects beyond the rear portion of said housing means between at least two of said tail portions of said terminal means, said around plate and said complementary around plate having interengaging means for mating said around plate and said complementary around plate perpendicular to each other when said connector and said complementary connector are mated along said mating axis and said complementary mating axis such that each of said terminals means and said complementary terminal means that are mated together are separated from each adjacent ones of said terminal means and said complementary terminal means by said mated around plate and complementary ground plate; and*

*a plurality of grounding termination members projecting from said ground coupling portion of said ground plate, each of said grounding termination members coupling said metallic shield of one of said plurality of cables to said around plate.*

*18. An electrical connector adapted to mate with a complementary connector having a complementary dielectric housing means, a complementary mating axis, and at least three complementary terminal means extending to a complementary mating region of said complementary connector, each of said three complementary terminal means having a complementary mating portion in said complementary mating region that extends in the direction of said complementary mating axis through a corner of a complementary rectangularly shaped area having a complementary center on a complementary line extending generally parallel to said complementary mating axis and a complementary generally planar around plate disposed in said complementary dielectric housing means that extends along said complementary mating axis to at least said complementary mating region between an adjacent pair of complementary terminal means and to at least opposite outer edges of said complementary rectangularly shaped area, said electrical connector comprising:*

*a dielectric housing means having a mating axis and at least three terminal means extending to a mating region of said connector, each of said three terminal means having a mating portion in said mating region that extends in the direction of said mating axis through a corner of a rectangularly shaped area having a center on a line extending generally parallel to said mating axis; and*

*a generally planar ground plate disposed in said dielectric housing means that extends along said mating axis to at least said mating region between an adjacent pair of terminal means and to at least opposite outer edges of said rectangularly shaped area, said ground plate and said complementary ground plate having interengaging means for mating said ground plate and said complementary ground plate perpendicular to each other when said connector and said complementary connector are mated along said mating axis and said complementary mating axis such that each of said terminals means and said complementary terminal means that are mated together are separated from each adjacent ones of said terminal means and said complementary terminal means by said mated around plate and complementary around plate.*

*19. An electrical connector adapted to mate with a complementary connector having a complementary dielectric housing means, a complementary mating axis, and at least three complementary terminal means extending to a complementary mating region of said complementary connector, each of said three complementary terminal means having a complementary mating portion in said complementary mating region that extends in the direction of said*

*complementary mating axis through a corner of a complementary rectangularly shaped area having a complementary center on a complementary line extending generally parallel to said complementary mating axis and a complementary generally planar ground plate disposed in said complementary dielectric housing means that extends along said complementary mating axis to at least said complementary mating region between an adjacent pair of complementary terminal means and to at least opposite outer edges of said complementary rectangularly shaped area, said electrical connector comprising:*

*a dielectric housing means having a mating axis and at least three terminal means extending to a mating region of said connector, each of said three terminal means having a mating portion in said mating region that extends in the direction of said mating axis through a corner of a rectangularly shaped area having a center on a line extending generally parallel to said mating axis and a pair of slots extending in said dielectric housing means perpendicular with respect to each other from said mating region so as to define four quadrants with only one of said terminal means disposed in each of said quadrants; and*

*a generally planar ground plate disposed in one of said slots in said dielectric housing means that extends along said mating axis to at least said mating region between an adjacent pair of terminal means and to at least opposite outer edges of said rectangularly shaped area, the other of said slots being adapted to receive said complementary ground plate when said connector and said complementary connector are mated such that said around plate and said complementary ground plate are mated perpendicular to each other.*

* * * * *